B. P. ROMAIN.
ART OF SYNCHRONIZING ALTERNATING CURRENT GENERATORS.
APPLICATION FILED DEC. 8, 1909.
1,057,278.
Patented Mar. 25, 1913.
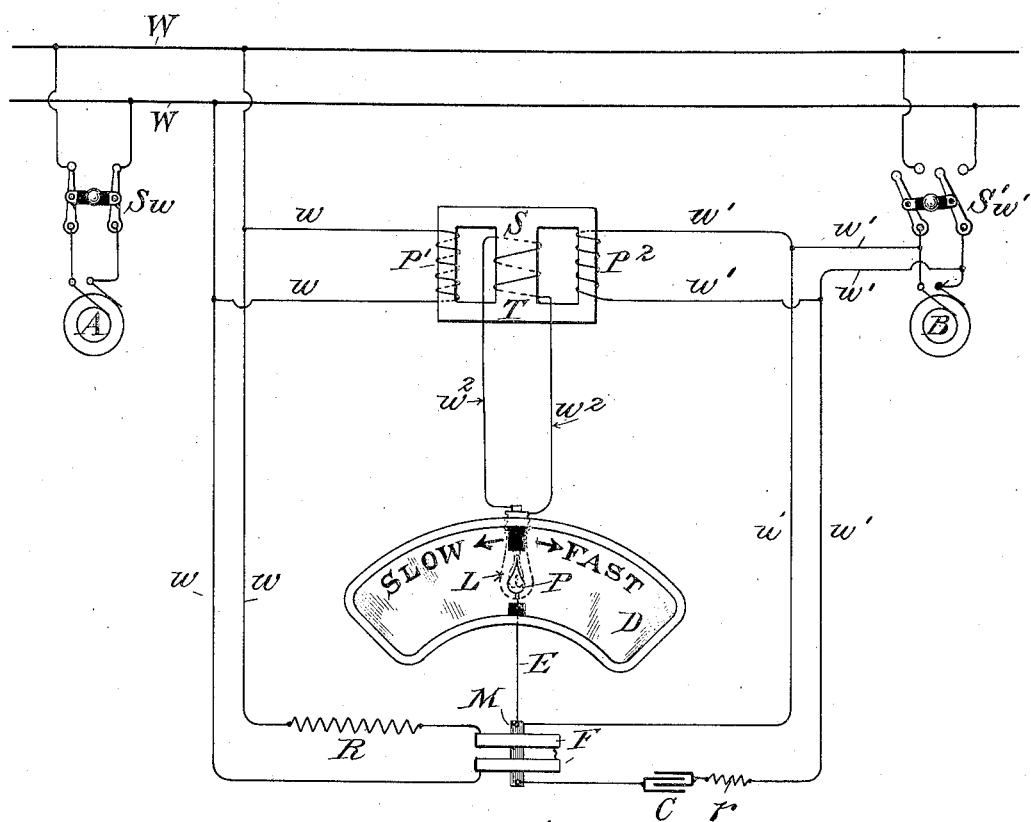
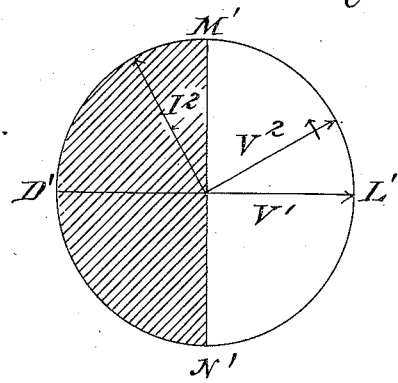

UNITED STATES PATENT OFFICE.

BURCHARD P. ROMAIN, OF NEWARK, NEW JERSEY, ASSIGNOR TO WESTON ELECTRICAL INSTRUMENT COMPANY, OF WAVERLY PARK, NEW JERSEY, A CORPORATION OF NEW JERSEY.

ART OF SYNCHRONIZING ALTERNATING-CURRENT GENERATORS.

1,057,278.     Specification of Letters Patent.     Patented Mar. 25, 1913.

Application filed December 8, 1909. Serial No. 532,037.

*To all whom it may concern:*

Be it known that I, BURCHARD P. ROMAIN, a citizen of the United States, and resident of Newark, county of Essex, and State of New Jersey, have made a new and useful Invention in the Art of Synchronizing Alternating-Current Generators, of which the following is a specification.

My invention relates to a novel method of and apparatus for indicating when alternating current generators are in synchronism.

The novel method involved and the general principles upon which my new synchronizing device operates may be clearly understood, if it be assumed that the motion of a movable system, which oscillates with a frequency corresponding to the difference in frequency of two alternating current generators can be made visible, in one direction only, during each of its cycles, the ocular effect will be that of a continuously rotating object seen during only a portion of each revolution, and having an average angular velocity equal to the difference in the frequencies of the two machines. If this motion of the movable body is made visible in one direction when the first machine has a higher frequency than the second, and in the other direction when the second machine has a higher frequency than the first, it will at once be seen whether the incoming machine is running too fast or too slow. Such a device would obviously perfectly serve the purpose of correctly indicating when the frequency of the two machines was equal, but would not indicate when the phase relationship of the two machines was right for coupling together. If, now, such a difference in frequency indicating instrument can be combined with a device which will serve to correctly indicate the phase coincidence of the two machines, the whole combination becomes an accurate synchroscope or synchronizing device. Such, in general terms, is the basic principle upon which my invention rests and the method and means I prefer to employ in carrying my invention into practice will be more fully understood from what follows.

For a full and clear understanding of my invention, such as will enable others skilled in the art to construct and use the same, reference is had to the accompanying drawings, in which, Figure 1 is a diagrammatic view illustrating two alternating current generators, one of which is connected directly in circuit with a system of current supply and with my novel apparatus, and the other also in circuit with my apparatus but out of circuit with the system of current supply. Fig. 2 is a diagrammatic view illustrating the theoretical mode of operation.

Referring to the drawings in detail, W, W represent the mains of a source of current supply and A an alternating current generator supposed to be running and operatively connected thereto through a switch S $w$. B represents a second alternating current generator provided with a switch $S^1$ $w^1$ for connecting it directly to the same mains when it is found to be in synchronism with the first generator.

My novel synchroscope utilizes an electro-dynamometer, preferably of the well known Weston type, such as is described in Reissue Patent No. 11,250, granted to Edward Weston on the 28th day of June, 1892, and having stationary field coils F, F operatively connected by conductors $w$, $w$ directly to the mains W, W, R being a non-inductive resistance for regulating the current flow thereto.

M represents the movable coil of the instrument which carries an index needle E provided with a pointer P, said movable coil having two spirally disposed conducting retractile springs which are opposed to each other and normally hold the coil in the central position shown, when no current is flowing, and connected directly in circuit with conductors $w^1$ $w^1$ running directly to conductors which connect the generator B with the switch $S^1$ $w^1$.

T represents a transformer, the primary coils $P^1$ $P^2$ of which are connected by conductors directly to conductors $w$, $w$ and $w^1$ $w^1$, the coils of the secondary S being connected by conductors $w^2$ $w^2$ to an incandescent electric lamp L located directly below the translucent face D of the instrument, the arrangement being such that the lamp L will be lighted to its maximum brilliancy when the machines A and B are in phase, and that the pointer P of the vibratory needle E may pass, as it oscillates, between the lamp and the illuminated translucent face D, the words "Slow" and "Fast" being indicated as shown upon such face in enlarged letters. This translucent face is made preferably of ground glass and by reason of this fact the index needle E and pointer P are only visible, when the lamp L is glowing.

C represents a condenser located in series with the movable coil M of the system and $r$ represents a small non-inductive resistance for giving to the current flowing through the movable coil a phase angle of 90° ahead of that in the field coil circuit when the E. M. F.'s. impressed across the movable and field coil circuits have the same phase and frequency. This small non-inductive resistance is only used when this angle is enough greater than 90° to cause a visible error.

It will be evident that when the two machines A and B are in phase no torque will be exerted upon the movable coil M and the pointer P will stand in its normal or central position, under the influence of the spiral springs hereinbefore referred to. As before stated the lamp L will now be glowing at its maximum brilliancy. As the machines pass out of phase the index needle E will be deflected to one side or the other, dependent upon which one is leading in phase. When the machines are in phase opposition the pointer P will, of course, stand in the central or normal position, but the lamp, under this condition, will be absolutely non-luminous and, therefore, the pointer cannot be seen.

Referring now to Fig. 2, let $V^1$ represent the instantaneous voltage of the generator A and the current through the field coils of the instrument; let $V^2$ represent the instantaneous voltage of B and $I^2$ the instantaneous current through the movable coil M. We now have only to deal with the phase relations of A and B; hence we may for simplicity consider $V^1$ to be stationary, while $V^2$ revolves with the frequency equal to the difference in the frequencies of the machines A and B, and in one direction or the other according to which is the greater. The lamp L is so connected that if $V^1$ and $V^2$ are equal the E. M. F. across it will be zero when $V^2$ is at $D^1$ and will be a maximum when $V^2$ is at $L^1$. Since the E. M. F. across the lamp L is proportional to the resultant of $V^1$ and $V^2$ this E. M. F. gradually increases as $V^2$ moves in either direction from $D^1$ to $L^1$. The instrument is so constructed that the E. M. F. across the lamp, when $V^2$ is at $M^1$ or $N^1$, is approximately such that any higher value causes the lamp to glow visibly. Under these conditions the lamp will be dark substantially while $V^2$ moves across the shaded area, and lighted approximately while $V^2$ moves across the clear area. When $V^2$ is at $N^1$, $V^1$ and $I^2$ will be in phase and the pointer will be at one or the other of the extreme ends of its travel, dependent upon the connections of the movable coil M to the conductors $w^1$, $w^1$. If $V^2$ travels in the direction shown by the arrow in Fig. 2 the pointer will move under the translucent face D (Fig. 1) from right to left reaching the central or normal position when $V^1$ and $V^2$ are in phase, and then $V^2$ will continue to travel to $M^1$ (Fig. 2). At about this point the lamp is extinguished and remains so until $V^2$ is advanced approximately to $N^1$, when the pointer P is again at the extreme right of the translucent face and is ready for a similar cycle. If $V^2$ moves in the opposite direction the pointer P could only be seen moving in the reverse direction. In order that the pointer may travel the full length of the translucent face on voltages or frequencies varying from the normal by an amount likely to be found in practice, the instrument is so adjusted that this pointer can move over the full length thereof with the lowest voltage and frequency with which it will be called upon to operate. Further travel under other conditions is either arrested by cushioned springs located at the opposite ends of the throw of the needle in the well known manner, or is obscured from view under the cap or cover of the instrument.

I do not limit myself in the practice of my method to the synchroscope embracing the especial details of construction illustrated in the accompanying drawings, as obviously a number of the features thereof might be departed from and still come within the scope of my claims hereinafter made. To illustrate, the condenser C may be replaced by a reactive coil and either of these may be placed, if preferred, in the field circuit; or the electro-dynamometer may be replaced by a statically actuated instrument or equivalent electromotive device. Two individual transformers may also replace the single transformer shown, these matters being well within the skill of those versed in the art. The movable and fixed coil circuits may be arranged and interconnected in other ways which will readily suggest themselves to such persons and the light from the lamp L, or from any luminous source variously controlled may be utilized in known ways and still come within the scope of my invention which is directed broadly to the combined use of an electro-dynamometer or motive device, and an electric or other lamp for indicating the phase relations of two alternating current generators and in such manner that when the movable part of the electromotive device is substantially stationary and the lamp at full glow two machines connected in circuit therewith are necessarily running in synchronism and phase coincidence, and may be switched into circuit with each other.

It will be observed that since the lamp L, is in circuit with both alternators A and B, the light emitted from said lamp and reflected from said pointer P will be at its maximum when the currents of said alternators are in, or nearly in, phase. It will further be seen, as above stated, that said lamp will go out when the said currents are in opposition so that the pointer P cannot then be seen. Likewise, it will be clear that the apparent rotations of the pointer P in each direction will have speeds inversely proportional to the change of phase difference between the currents, which speeds will be zero when the currents are of the same frequency, whether substantially in phase or in opposition. It, therefore, follows that by combining the transformer T, lamp L and pointer P in the relations disclosed, the apparatus indicates at all times whether the currents are approaching the same phase or approaching opposition, and are in phase, or are in opposition, a result not attainable with instruments heretofore proposed, so far as I am aware.

Having thus described my invention what I claim and desire to secure by Letters Patent of the United States is—

1. The method of ascertaining when currents from two alternating current generators having different frequencies are in phase, which consists in causing the differences in frequency of the two currents to move an object; and utilizing the difference in phase of said currents to so illuminate the said object as to produce the appearance of a rotation in one direction when the first machine has a higher frequency than the second and to produce the appearance of a rotation in the opposite direction when the second machine has a higher frequency than the first, substantially as described.

2. The method of ascertaining when currents from two alternating generators are in phase in order to readily adjust the speeds of said generators preparatory to connecting the same in parallel, which consists in causing the differences in phase of the said currents to produce successive differences in the brilliancy of a light; causing the differences in frequencies of said currents to move an object; simultaneously illuminating said moving object from said light so as to cause the latter to apparently rotate in a definite direction dependent upon which generator is running the faster; and finally to cause said changes in brilliancy and said apparent rotations to cease as the speed of the one generator closely approximates the speed of the other, substantially as described.

3. The method of ascertaining when currents from two alternating generators are in phase or are in opposition while adjusting the speed of one of said generators before connecting them in parallel, which consists in causing the relative changes in the frequencies and phases of the currents as the adjustment proceeds to produce respectively successive movements of an object and changes in the light emitted from a lamp; causing said object to be so illuminated from said lamp, as to produce apparent rotations of said object in different directions according to which generator has the higher speed; and as the speed of the machines approach each other causing said apparent rotations to slow down and the said light to increase until said speeds are approximately equal when said apparent rotations cease and said light is constant, substantially as described.

4. The method of ascertaining when two alternating current generators have the proper speeds to be connected in parallel, which consists in causing the frequency difference of the currents to move an object at a speed depending upon the instantaneous rate of change of the phase difference of the currents; causing the phase difference to vary the intensity of a light; said object being so illuminated by said varying light as to produce apparent rotations of said object in different directions according to which generator is running the faster and to cause said apparent rotations gradually to slow down and cease when said currents approach the same frequency, whether they are approaching the same phase, or opposition, substantially as described.

5. A synchroscope, comprising an electromotive device provided with a stationary and a movable part adapted to be operatively connected in circuit with a pair of alternating current generators; an electric lamp; connections between each generator and said lamp adapted to cause the light emitted to vary with the difference in phase of said generators; the movable part of the said electro-motive device being provided with an indicating object adapted to move therewith in accordance with the difference in frequency of said generators; said moving indicating object being so illuminated by said varying light as to cause said object to apparently rotate for a part of its movement in one direction or another according to which machine is running the faster; and the connections being such that the luminous effects of the lamp continually grow brighter as the currents approach the same phase until finally when the proper synchronism is attained the indicating object is stationary and the luminous effect of the lamp thereon is constant, substantially as described.

6. A synchroscope for indicating the phase relations of two alternate current generators comprising a movable indicator; an electric lamp illuminating said indicator; connections between each circuit of each generator and said lamp whereby the phase differences of said currents vary the said illuminating effect of said lamp; additional connections between the circuits of said generators and said indicator for operating the latter by the differences in frequency of said currents; said connections being such that when synchronism is approached the lamp will glow at its maximum brilliancy and the indicator will be stationary, and when the currents are in opposition the said lamp will be extinguished while the indicator will also be stationary, substantially as described.

7. A synchroscope for indicating the phase relations of two alternate current generators comprising a movable indicator; an electric lamp illuminating said indicator; connections between each circuit of each generator and said lamp whereby the phase differences of said currents vary the said illuminating effect of the lamp; additional connections between the circuits of said generators and said indicator for operating the latter by the differences in frequency of said currents, said connections being such that when synchronism is approached the lamp will glow at its maximum brilliancy and the indicator will be stationary, and when the currents are in opposition the said lamp will be extinguished while the indicator will also be stationary; and means for concealing said indicator when the lamp is not at its maximum brilliancy, substantially as described.

8. A synchroscope comprising an electro-dynamometer adapted to be connected in circuit with two alternating current generators to be synchronized; an indicator adapted to move with the movable part of said electro-dynamometer; a lamp adapted to illuminate said indicator and so connected with both generators as to glow at its maximum brilliancy when synchronism is attained, but to glow with a less and less brilliancy as the said currents approach opposition; and means for concealing the indicator from view when the currents are not in phase, substantially as described.

9. Means for ascertaining when two alternating current generators are in proper running relation preparatory to connecting them in parallel, comprising an electromotive device having a stationary and a movable part for connection to said generators and an indicator carried by the movable part in combination with an electric lamp and connections with both generators adapted to so illuminate said indicator as to cause it to have apparent rotations; said connections causing the lamp to glow at its maximum brilliancy when the generators have been so adjusted as to be in the same phase; and means for concealing the indicator from view when the currents are not in the same phase, substantially as described.

10. In a synchroscope for ascertaining when two alternating current generators are in proper running relation, the combination of a movable indicator; electrically controlled means for causing the same to vibrate back and forth with a speed proportional to the differences in frequency of said generators with which said indicator is connected; an electric lamp operatively connected with each generator adapted to illuminate said indicator during half vibrations only, and thereby produce apparent rotations of said indicator; and said connections being such that said lamp will glow at its maximum brilliancy only when proper synchronism is attained, and will become extinguished when opposition is had, substantially as described.

11. In a synchroscope, the combination of a movable indicator; a dynamometer with which said indicator is operatively connected; two alternating current generators; circuits between said generators and said dynamometer; an electric lamp adapted to illuminate said indicator; inductive connections between said lamp and each of said generators, the connections being such that the brilliancy of said lamp will vary according to the phase relation of said generators and will become a maximum when said generators are in phase; and means for concealing the indicator when the lamp is not glowing, substantially as described.

12. In a synchroscope adapted to indicate whether two alternating current generators are in phase or in opposition, the combination of means adapted to be fed from each of said generators for causing a lamp to be lighted when the currents are in phase, to be dimmed when not in phase, and to be extinguished when in opposition; with means also operated from each of said generators for causing a pointer illuminated from said lamp to have apparent movements in definite directions at decreasing speeds as said currents approach the same frequency, and to be stationary when such frequency has been attained, substantially as described.

In testimony whereof I have signed my name to this specification in the presence of two subscribing witnesses.

BURCHARD P. ROMAIN.

Witnesses:
J. A. DORRIAN,
CAXTON BROWN.